(12) United States Patent
Tajiri

(10) Patent No.: US 6,343,864 B1
(45) Date of Patent: Feb. 5, 2002

(54) LIQUID CRYSTAL PROJECTOR EQUIPMENT

(75) Inventor: Shinichiro Tajiri, Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/463,531
(22) PCT Filed: May 20, 1999
(86) PCT No.: PCT/JP99/02657
  § 371 Date: Jan. 20, 2000
  § 102(e) Date: Jan. 20, 2000
(87) PCT Pub. No.: WO99/60440
  PCT Pub. Date: Nov. 25, 1999

(30) Foreign Application Priority Data

May 20, 1998 (JP) .......................................... 10-138149

(51) Int. Cl.$^7$ ................................................ G03B 21/14
(52) U.S. Cl. .................. 353/20; 353/33; 349/9
(58) Field of Search .......................... 353/20, 31, 33, 353/34, 37, 81; 359/5, 8, 9

(56) References Cited

U.S. PATENT DOCUMENTS

| | | | | |
|---|---|---|---|---|
| 5,826,959 A | * | 10/1998 | Atsuchi | 353/20 |
| 6,113,239 A | * | 9/2000 | Sampsell et al. | 353/31 |
| 6,176,586 B1 | * | 1/2001 | Hirose et al. | 353/31 |
| 6,183,090 B1 | * | 2/2001 | Nakanishi et al. | 353/20 |
| 6,183,091 B1 | * | 2/2001 | Johnson et al. | 353/20 |

* cited by examiner

Primary Examiner—William Dowling
(74) Attorney, Agent, or Firm—Flynn, Thiel, Boutell & Tanis, P.C.

(57) ABSTRACT

Liquid crystal projector equipment in which light from light source 1 is condensed by lens arrays 2 and 4 and lens 5; the condensed light strikes PBS 22 where the s-polarized-light component of the green-color-range light is reflected to strike reflex liquid crystal plate for green color range, and the modulated and reflected p-polarized light component passes through PBS 22 and dichroic prism 11. The p-polarized-light component that has passed through PBS 22 falls on PBS 8 and then on reflex liquid crystal plate 10B for blue color range by way of blue-color-range filter 9B; the modulated reflected p-polarized light passes through PBS 8 to be reflected by dichroic prism 11; the p-polarized-light component that has passed PBS 8 falls on reflex liquid crystal plate 10R for red color range by way of red-color-range light transmitting filter 9R; the modulated and reflected s-polarized light is reflected by dichroic prism 11 and projected on the screen together with image lights of green color range and blue color range by means of the projection lens.

8 Claims, 7 Drawing Sheets

《Characteristic wave reflection coefficient》

(a) Broad band PBS    (b) Narrow band PBS

《Characteristic of rotation of plane of polarization》

(a) Broad band phase plate (b) Narrow band phase plate

US 6,343,864 B1

LIQUID CRYSTAL PROJECTOR EQUIPMENT

TECHNICAL FIELD

The present invention relates to a liquid crystal projector equipment that can be built compact by reducing the number of parts by using narrow-band polarizing beam splitters or narrow-band phase plates or the like.

BACKGROUND ART

A conventional liquid crystal projector equipment using a reflex liquid crystal plate as is shown in FIG. 1, for example, comprises lens arrays 2 and 4 and lens 5 for collecting white light from light source 1, dichroic mirrors 71 and 72 for separating the white light into lights of three different colors, namely, the light of red color range, light of green color range and light of blue color range, polarizing beam splitter (PBS) 74R, 74G and 74B for separating s-polarized-light components of the lights of respective color ranges to let the separated s-polarized-light components of the light fall on reflex liquid crystal plates 10R for red color range 10G for green color range and 10B for blue color range respectively, cross dichroic prism 75 for synthesizing the image lights of p-polarized-light components of the color ranges which are modulated and reflected to be output, and projection lens 12 for projecting the image light on a screen.

Such a conventional liquid crystal projector equipment is required to comprise not only a relatively expensive cross dichroic prism 75 but also the reflex liquid crystal plates 10R, 10G and 10B arranged so as not interfere one another in each of optical paths of the light separated into the lights of red color range, green color range and blue color range, which results in the increase in the size of casing.

An object of the present invention, reflecting such problem, is to reduce the size of the equipment by reducing the number of the dichroic mirrors through the use of filters and by providing color separation function through the use of the PBS having narrow-band characteristic or by using ½ phase plate having narrow-band characteristic.

DISCLOSURE OF THE INVENTION

The liquid crystal projector equipment according to the present invention comprises a light source for outputting a white light, a first dichroic mirror for reflecting the green-color-range light from the light source while transmitting the red-color-range light and blue-color-range light therefrom, a first PBS for reflecting s-polarized-light component, a reflex liquid crystal plate for green color range for receiving, modulating, reflecting and outputting, through the first PBS, the green-color-range light from the first PBS, a second PBS for reflecting s-polarized-light components of the red-color-range light and blue-color-range light while transmitting the p-polarized-light component thereof, a reflex liquid crystal plate for blue color range designed for receiving s-polarized-light component from the second PBS through a blue-color-range light transmitting filter and modulating and reflecting the s-polarized-light component for output through the second PBS, a reflex liquid crystal plate for red color range designed for receiving p-polarized-light component from the second PBS through the blue-color-range light transmitting filter and modulating and reflecting the p-polarized-light component for output by being reflected by the second PBS, a first dichroic prism for transmitting the image light of green color range from the first PBS while reflecting the image light of blue color range and the image light of red color range from the second PBS, and a projection lens for projecting the image light from the first dichroic prism on a screen.

Further, the equipment may comprise a third PBS for separating the s-polarized-light component of the green-color-range light from the light source so that the light from the third PBS is made to fall on the reflex liquid crystal plate for the green color range and to be modulated and reflected for being output by passing through the third PBS.

Alternatively, the equipment may comprise a fourth PBS and a first ½ phase plate for transmitting the s-polarized-light component of the blue-color-range light and rotating 90° its plane of polarization to convert the s-polarized-light component into p-polarized-light component placed in the preceding stage of the second PBS so that the s-polarized-light component (blue-color-range light) reflected by the second PBS falls directly on the reflex liquid crystal plate for blue color range, while the p-polarized-light component (red-color-range light) that has passed through the second PBS falls directly on the reflex liquid crystal plate for red color range, thereby enabling to do without the filters for blue-color-range light and red-color-range light.

Further alternatively, the equipment may comprise the fourth PBS for adjusting the light from said light source to the s-polarized-light component of the light so that the light from the fourth PBS falls on the first dichroic mirror; the light from the first dichroic mirror falls on the second PBS by way of the first ½ phase plate; the s-polarized-light component (blue-color-range light) is reflected by the second PBS while transmitting the p-polarized-light component (red-color-range light); the s-polarized-light component from the second PBS falls on the reflex liquid crystal plate for blue color range, and the s-polarized-light component is modulated and reflected to be output by passing through the second PBS; the p-polarized-light component from the second PBS falls on the reflex liquid crystal plate for red-color-light range, and the p-polarized-light component is modulated and reflected by the second PBS for output.

Further alternatively, the equipment may comprise a second dichroic mirror designed for transmitting green-color-range light from the fourth PBS while reflecting red-color-range light and blue-color-range light so that the green-color-range light from the second dichroic mirror falls on the reflex liquid crystal plate for green color range by way of the fist PBS and the blue-color-range light and red-color-range light fall on the 1-½ phase plate.

Further, the equipment may comprise a second ½ wavelength plate for rotating 90° the plane of polarization of the light of total wavelength range provided before a reflex liquid crystal plate for red color range so that the p-polarized-light component from the second PBS can be converted into the s-polarized-light component and the s-polarized-light component incident method similar to those for blue color range and green color range can be applied to the reflex liquid crystal plate for red color range.

Further, the equipment may comprise a fifth PBS capable of outputting only the p-polarized-light component of the light from the light source, a second ½ wavelength plate so that for rotating 90° the plane of polarization of the p-polarized-light component of red color range from the fifth PBS while transmitting the p-polarized-light components of the blue-color-range light and green-color-range light, a sixth PBS for reflecting the s-polarized-light component (red-color-range light) from the first ½ phase plate while transmitting the p-polarized-light component (blue-color-range light and green-color-range light), a second dichroic prism for transmitting the p-polarized-light component of blue-color-range light from the sixth PBS, while reflecting the green-color-range light, making the s-polarized-light component from the sixth PBS fall on a reflex liquid crystal plate for red color range, making the blue-color-range light from the second dichroic prism fall on the reflex liquid crystal plate for blue color range, making the green-color-range light fall on the reflex liquid crystal plate for green color range, and making the image light modulated and reflected by each of the reflex liquid crystal plates for various color ranges to be projected on a screen by a projection lens by way of the sixth PBS.

In this case, when the second ½ wavelength plate is provided before the reflex liquid crystal plate for converting the s-polarized-light component from the sixth PBS into the p-polarized-light component, the p-polarized-light incidence type reflex liquid crystal plate similar to those for blue color range and green color range can be used.

BEST MODES FOR CARRYING OUT THE PRESENT INVENTION

The modes for carrying out the present invention will be described below referring to drawings.

Figure 1:
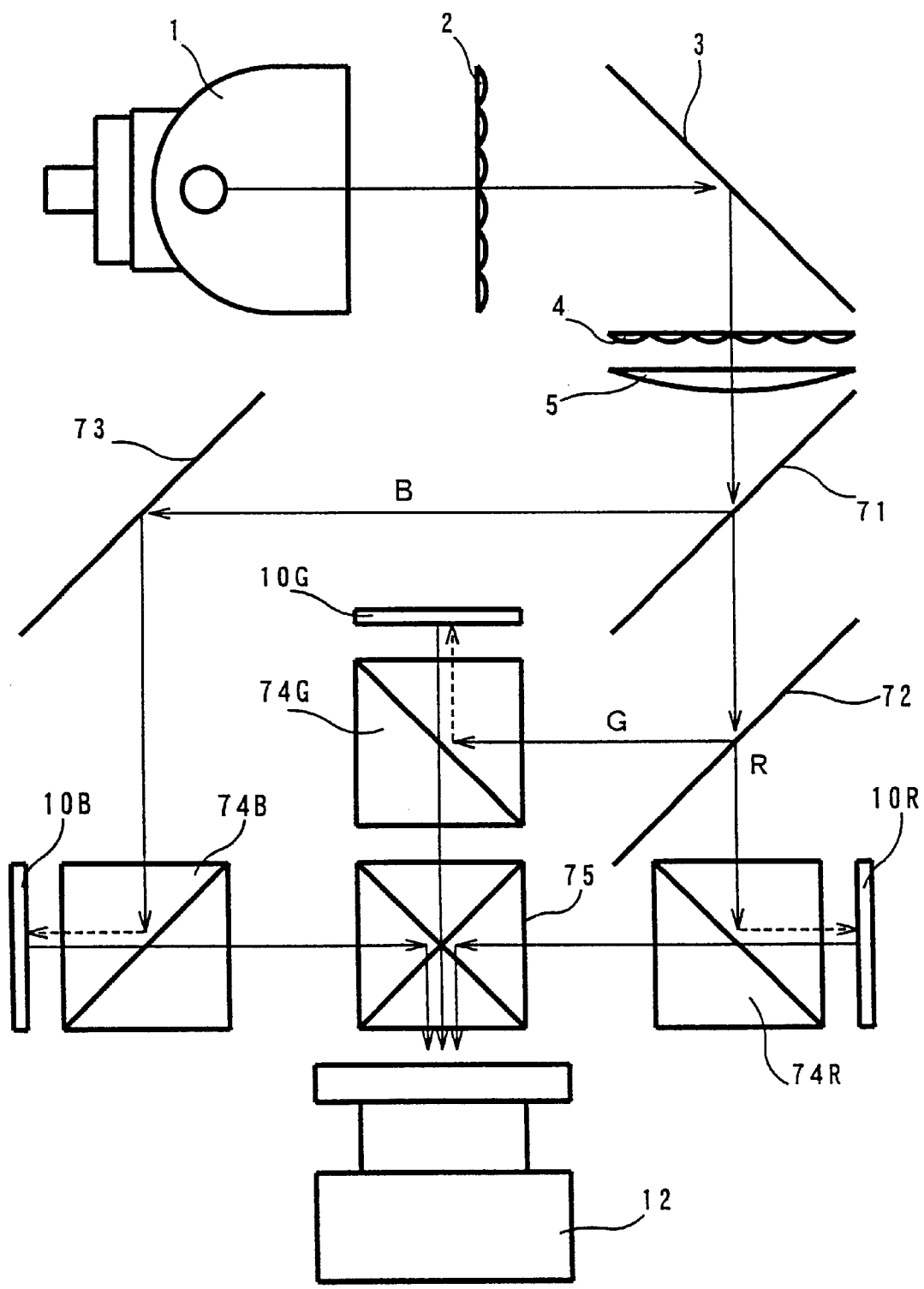
FIG. 1 is a schematic structural diagram illustrating the principal parts of a conventional liquid crystal projector equipment.
Figure 2:
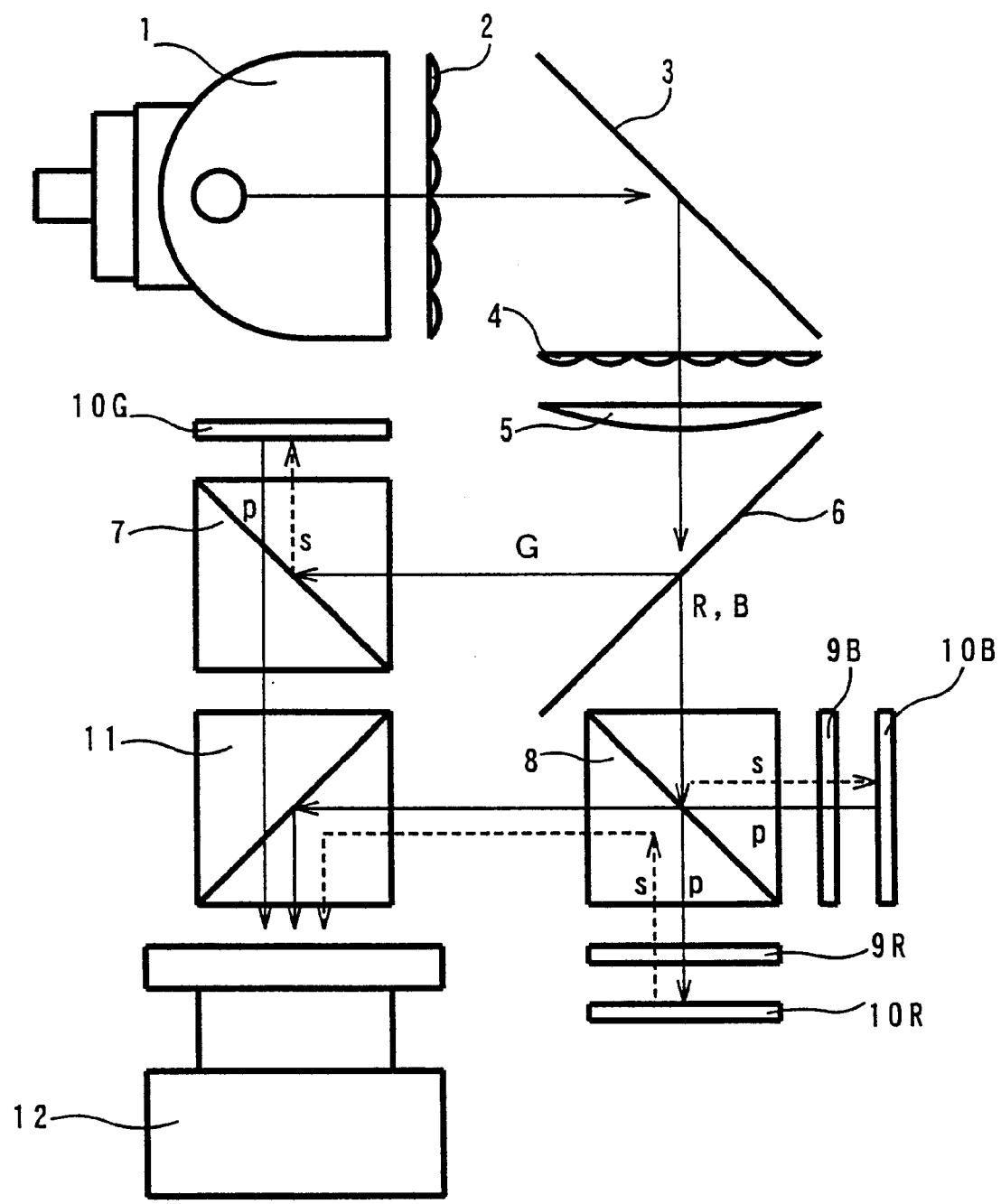
FIG. 2 is a schematic structural diagram illustrating the principal parts of the first embodiment of the present invention.
Figure 4:
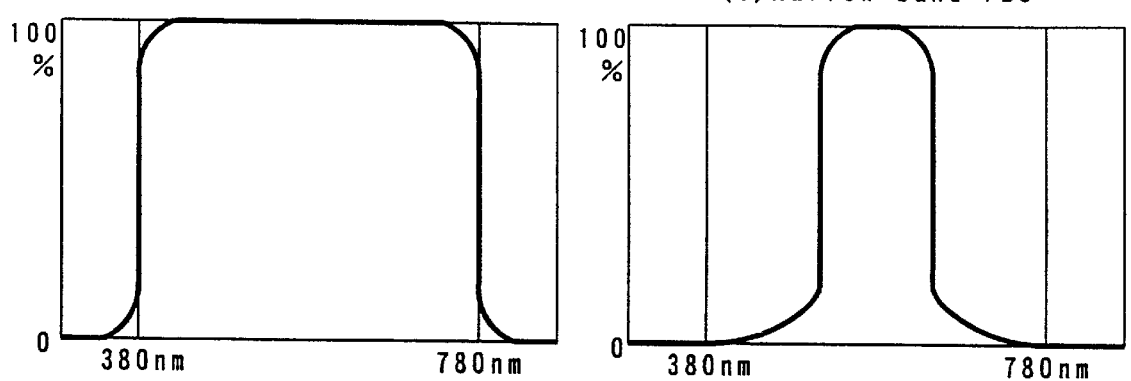
FIG. 4 is characteristic diagram showing the reflection coefficient of the s-wave by the polarized beam splitter (PBS).

FIG. 2 shows the liquid crystal projector equipment as the first embodiment of the present invention, wherein numeral 1 denotes the light source for emitting the white light by using metal halide lamp; 2 and 4, lens arrays for collecting the white light from the light source 1; 3, a total reflection mirror; 5, a condenser for further collecting the white light from the lens array 4; 6, the first dichroic mirror for reflecting the green-color-range light while transmitting the red-color-range light and blue-color-range light out of the white light incoming from the condenser 5; 7, the first PBS for reflecting the s-polarized-light component of the light reflected by the first dichroic mirror 6 while emitting the p-polarized-light component thereof and 8, the second PBS for reflecting the s-polarized-light component of the light that has passed through the first dichroic mirror while emitting the p-polarized-light component thereof, the both having broad-band reflection characteristic as is represented by the characteristic (a) in FIG. 4; 9R, a red-color-range light transmitting filter for transmitting the red-color-range light that has passed through the second PBS 8; 9B, the blue-color-range light transmitting filter for transmitting the blue-color-range light reflected by the second PBS; 10G, the reflex liquid crystal plate of s-polarized-light incidence type for green color range for producing image by reflecting the light from the first PBS 7; 10B, a reflex liquid crystal plate of s-polarized-light incidence type for blue color range for producing image by reflecting the light reflected by the second PBS 8; 10R, a reflex liquid crystal plate of p-polarized-light incidence type for red color range for producing image by reflecting the light that has passed through the second PBS 8; 11, the first dichroic prism for transmitting the green-color-range light while reflecting the blue-color-range light and red-color-range light; 12, the projection lens.

In the above arrangement, the white light as natural polarized light from the light source 1 is condensed by the two sets of lens arrays 2 and 4 and the condenser 5 and falls on the first dichroic mirror 6. The first dichroic mirror 6 reflects the green-color-range light while transmitting the red-color-range light and blue-color-range light. The green-color-range light strikes the first PBS and only the s-polarized-light component thereof is reflected to fall on the reflex liquid crystal plate 10G for green color range, and the image light of the green color range is modulated with the green-color-range image signal and reflected as the image light of green color range for output. Being a p-polarized-light, this image signal passes through the first PBS 7 and the first dichroic prism 11.

The blue-color-range light and red-color-range light which have passed through the first dichroic mirror 6 fall on the second PBS 8, and the s-polarized-light components thereof are reflected, while the p-polarized-light components thereof are transmitted. Of the s-polarized-light component, only the blue-color-range light that has passed through the filter 9B, designed for transmitting the blue-color-range light, falls on the reflex liquid crystal plate 10B and is modulated with blue-color-range image signal and reflected to be output.

Being the p-polarized light, this image light transmits the second PBS 8 and reflected by the first dichroic prism 11. Of the p-polarized component from the second PBS 8, only the red-color-range light that has passed through the red-color-range light transmitting filter 9R falls on the reflex liquid crystal plate for red color range, and the image signal of the red color range is modulated with the red-color-range image signal and reflected to be output. Being the s-polarized light, this image light is reflected by the first dichroic prism 11 and projected, together with the image light of green color range and that of blue color range, on a screen by the projection lens 12.

As described in the above, the liquid crystal projector equipment according to the first embodiment is capable of processing the blue-color-range light and red-color-range light with one optical path and so one optical path can be omitted, thereby enabling the equipment to be built compact. Further, not only the cross dichroic prism can be replaced with dichroic prism but also only dichroic mirror will do, thereby contributing to the low cost of the equipment.

Figure 3:
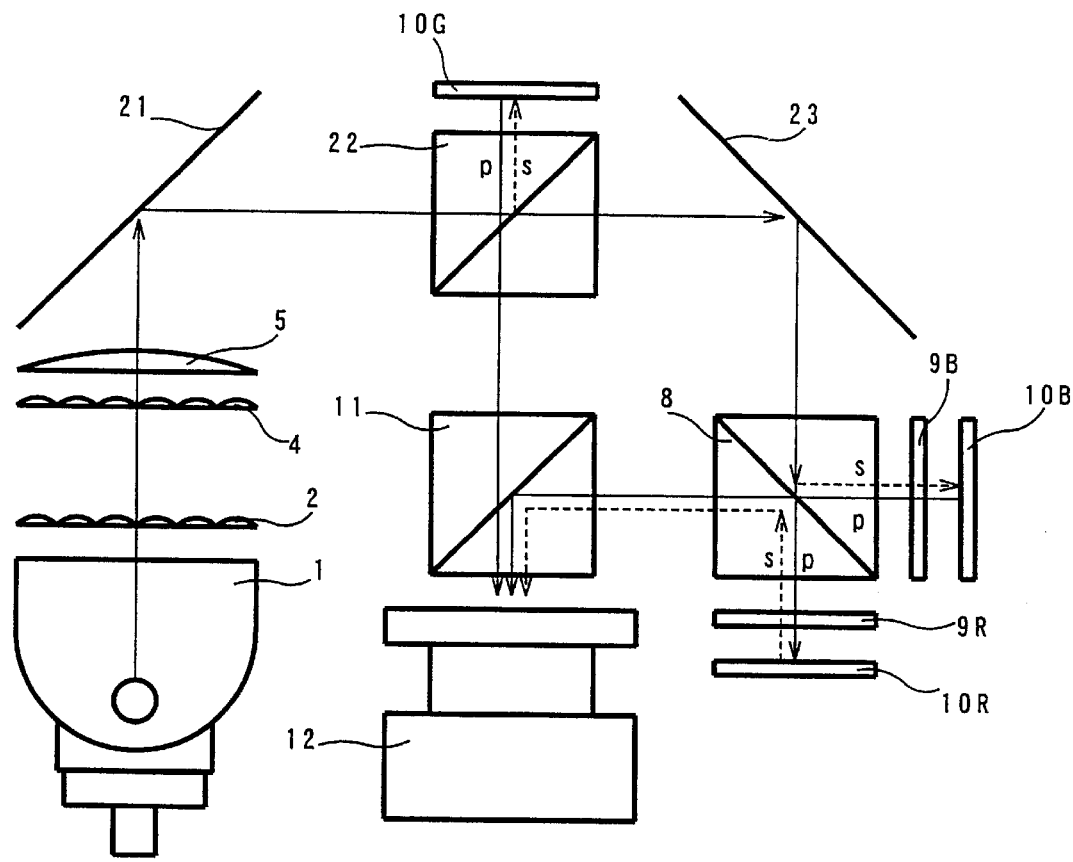
FIG. 3 is a schematic structural diagram illustrating the second embodiment of the present invention.

FIG. 3 shows the liquid crystal projector as the second embodiment of the present invention. In this figure, numerals 21 and 23 denote total reflection mirrors; 22, the third PBS having the narrow band characteristic as is shown in FIG. 4(b) and designed to reflect the s-polarized-light component of the green-color-range light of the white light from the condenser 5 and transmit the p-polarized-light component thereof. The descriptions of other parts of arrangement of the equipment similar to those of the first embodiment are omitted here.

In the above arrangement, the white light condensed by the two sets of lens arrays 2 and 4 and a condenser 5 is reflected by a total reflection mirror 21 to fall on the third PBS 22, where only the s polarized light component of the green-color-range light is reflected to fall on the reflex liquid crystal plate 10G for green color range, where the green-color-range light is reflected for output after being modulated with the green-color-range image signal.

The green-color-range image light (p-polarized-light) passes thorough the third PBS 22 and the first dichroic prism 11. Of the green-color-range light from the light source, the light other than the s-polarized-light component passes through the third PBS 22 and is reflected by a total reflection mirror 23 to strike the second PBS 8.

The rest of the actions are similar to those of the first embodiment and thus omitted here.

As described above, in the liquid crystal projector equipment as the second embodiment, the light that has passed through the third PBS 22 can be used for other colors by using the third PBS 22 having a narrow band characteristic, thereby making the dichroic mirror unnecessary to contribute to cost reduction.

Figure 5:
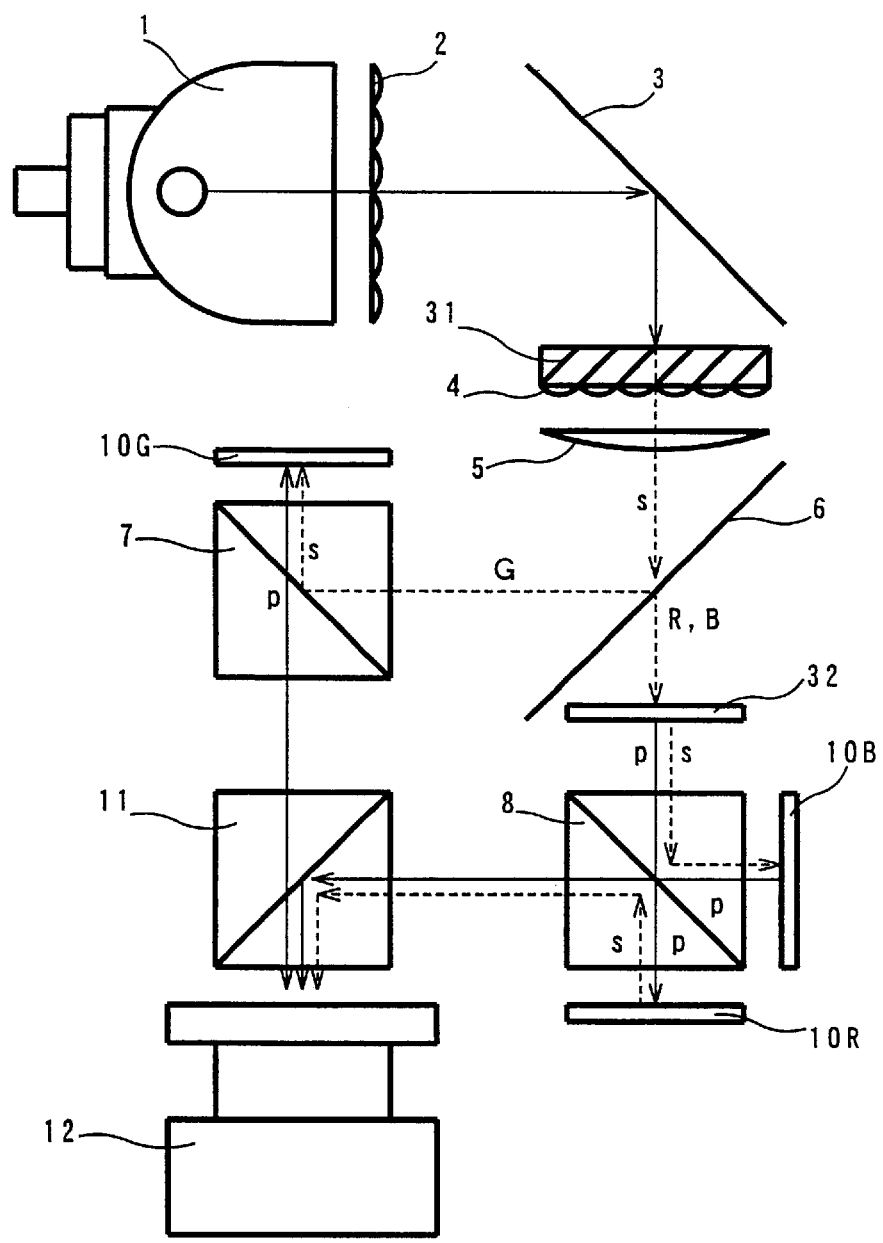
FIG. 5 is a schematic diagram illustrating the principal parts of the third embodiment of the present invention.

FIG. 5 shows the liquid crystal projector equipment as the third embodiment of the present invention. In this embodiment, the lens array 4 of the liquid crystal projector equipment of the first embodiment (FIG. 2) is combined with the fourth PBS 31 for outputting only the s-polarized-light component of the white light from the light source 1, and the first ½ phase plate 32 is interposed between the dichroic mirror 6 and the second PBS 8 to omit the red-color-range light filter 9R and blue-color-range light filter 9B.

Having a plane-of-polarization-rotation characteristic with a narrow-band characteristic, the first ½ phase plate 32 rotates 90° the plane of polarization of red-color-range light to convert the s-polarized-light component into p-polarized-light component and transmits the s-polarized-light component of the blue-color-range light.

The rest of the parts of the arrangement is similar to those of the arrangement of the first embodiment.

Figure 6:
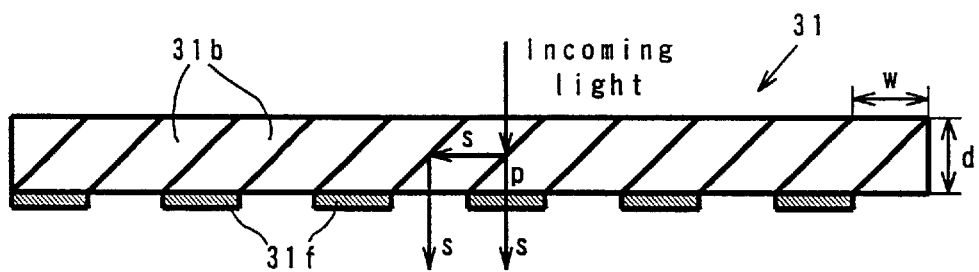
FIG. 6 is an illustrative diagram of the fourth PBS.

The fourth PBS, as shown in FIG. 6, comprises a plurality of accumulated parallelogramic small blocks 31b of the PBS, having equal surface width w and equal thickness d and angle of 45°, and a plurality of ½ phase plates 31f fit to the output surface of every other small block 31b. The fourth PBS 31 having such a structure is designed so that each output of the lens array 2 focuses on the small blocks 31b which are not provided with the ½ phase plate 31f, and the light will not fall on the small blocks 31b which are not provided with the ½ phase plates, thereby enabling only the s-polarized-light component of the light to be output.

That is, of an incoming light, the p-polarized-light component passes through the inclined boundary surface of the small block 31b while the s-polarized-light component is reflected.

The transmitted p-polarized light component is converted into the s-polarized-light component with respect to the plane of polarization for output by means of the ½ phase plate 31f.

The reflected s-polarized-light component is reflected again by the boundary surface of the small block 31b to be output.

In this way, the light passing through the fourth PBS 31 is converted into the s-polarized-light component of the light.

When the lens array 2 is arranged so that the light output through each lens focuses on the small blocks 31b arranged corresponding to the ½ phase plates 31f, the p-polarized-light component that is transmitted to the boundary surface is directly output, while the s-polarized-light component is reflected again to be converted into the p-polarized-light component with respect to the plane of polarization for output by the ½ phase plate 31f. In this way, only the p-polarized light component is made to pass through the fourth PBS 31.

In the arrangement described above, the white light converted into the s-polarized-light component by the fourth PBS falls on the dichroic mirror 6, and the green-color-range light is reflected, while the blue-color-range light and red-color-range light are transmitted. The reflected green-color-range light (s-polarized-light component) falls on the first PBS 7 to be reflected and then arrives at the reflex liquid crystal plate 10G for green color range.

On the other hand, the blue-color-range light and red-color range light which have passed through the dichroic mirror 6 strike the first ½ phase plate 32, and the s-polarized-light component of the blue-color-range light is transmitted, while the red-color-range light is converted into the p-polarized light component to fall on the second PBS 8. The s-polarized-light component (blue-color-range light) is reflected by the second PBS 8 and strikes the reflex liquid crystal plate 10B, and the p-polarized-light component (red-color-range light) is transmitted to fall on the reflex liquid crystal plate 10R for red color range. The s-polarized-light component is of a blue-color-range light and so the blue-color-range light transmitting filter is not necessary, and similarly the red-color-range light transmitting filter is not necessary for the p-polarized-light component being of a red-color-range light.

The actions of other parts are similar to those of the first embodiment and thus omitted here.

In this way, the liquid crystal projector equipment as the third embodiment has advantages such as a higher light source utilization efficiency and a higher intensity of illumination of projected image, because the planes of polarization of the white light from the light source are equalized.

Figure 8:
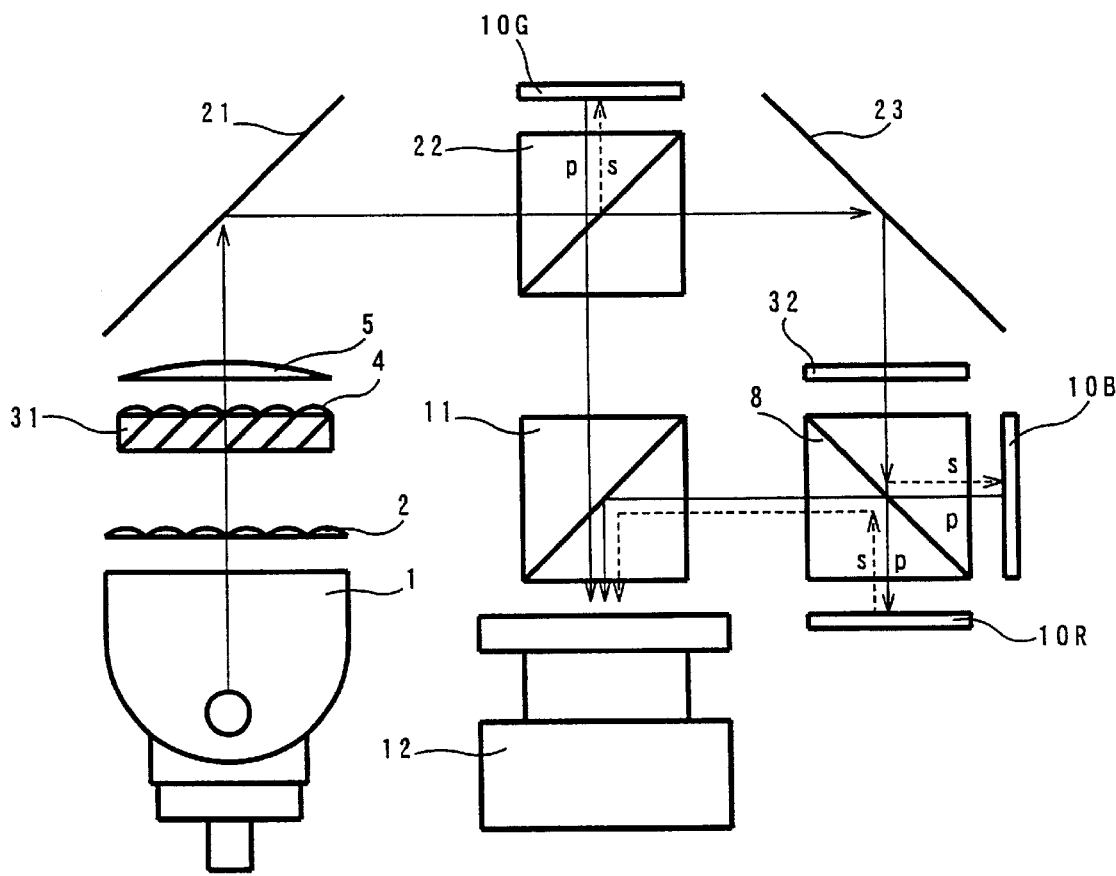
FIG. 8 is a schematic structural diagram illustrating a part of the fourth embodiment of the present invention.

FIG. 8 shows the liquid crystal projector equipment as the fourth embodiment of the present invention, wherein the lens array 4 according to the second embodiment (FIG. 3) is combined with the fourth PBS 31 as in the case of the third embodiment, and the first ½ phase plate 32 is interposed between the total reflection mirror 23 and the second PBS 8 as in the case of the second embodiment, thereby omitting the red-color-range light transmitting filter 9R and the blue-color-range light transmitting filter 9B.

The descriptions of other parts of the arrangement are similar to those of the second embodiment and thus omitted here.

In the arrangement described above, the white light from the light source 1 falls on the fourth PBS 31 to be adjusted to the s-polarized-light component, falls on the third PBS 22, reflected with respect to the s-polarized-light component of green-color-range light and falls on the reflex liquid crystal plate for green color range, while the s-polarized-light component of the light, which has passed through the third PBS 22, other than the green-color-range light strikes the first ½ phase plate 32. Subsequent actions are similar to those of the third embodiment.

Further, in each of the embodiments described above, when the distances between the light source 1 and the reflex liquid crystal plates 10G, 10B and 10R differ from one another, such differences in distance are adjusted by using a relay lens (not shown) to equalize the condition of incoming light.

Figure 9:
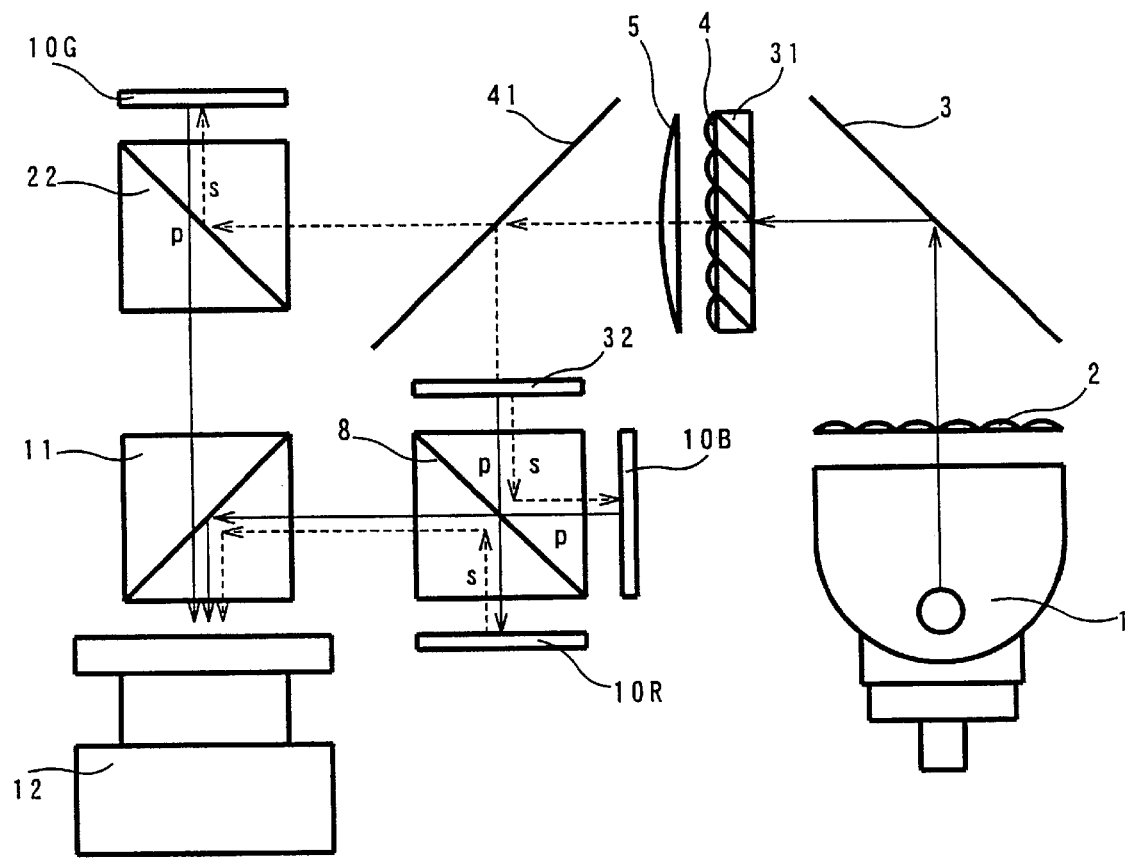
FIG. 9 is a schematic structural diagram illustrating the principal parts of the fifth embodiment of the present invention.

FIG. 9 shows the liquid crystal projector equipment as the fifth embodiment of the present invention, wherein the first dichroic mirror 6 of the liquid crystal projector equipment of the third embodiment (FIG. 5) is replaced with the second dichroic mirror 41 that transmits the green-color-range light, while reflecting the blue-color-range light and red-color-range light. The descriptions of other parts of arrangement are similar to those of the third embodiment and thus are omitted here.

Thus, the location of the light source 1 is reversed from that of the second embodiment (FIG. 3) or that of the fourth embodiment (FIG. 8, wherein the light source is omitted), so that the projection lens can be placed at the left side.

Further, the distances between the light source 1 and the reflex liquid crystal plates are equalized, thereby dispensing with the relay lens for correction.

Figure 7:
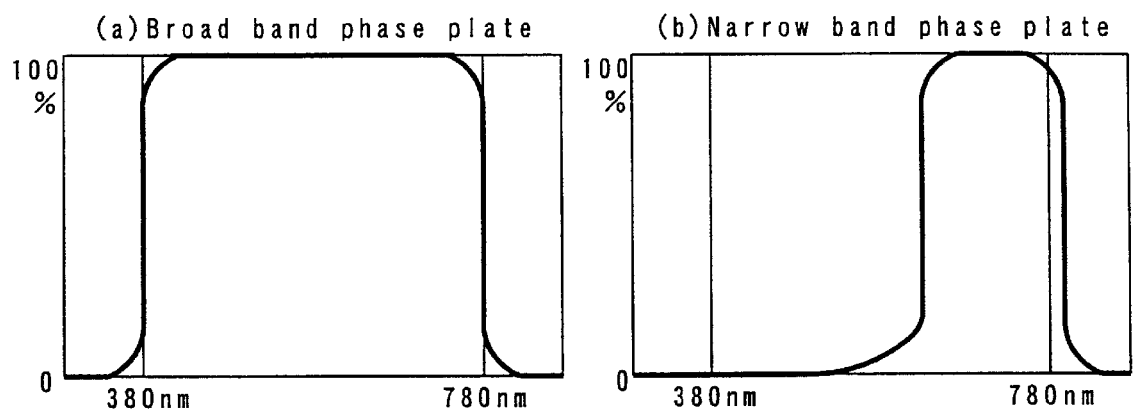
FIG. 7 is a characteristic diagram showing the rotational coefficient of the plane of polarization by the ½ phase plate.
Figure 10:
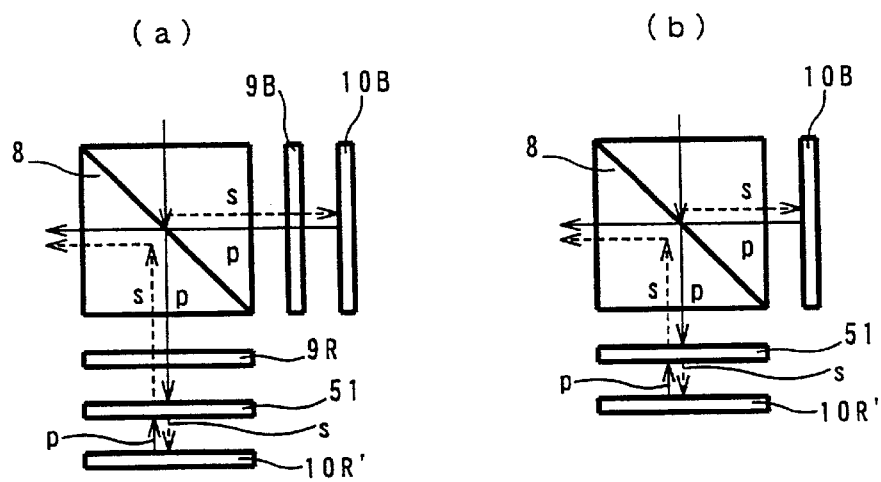
FIG. 10 is a schematic structural diagram illustrating an embodiment wherein the second ½ phase plate is provided before the reflex liquid crystal plate for red color range, (a) being the case applicable to the embodiments shown in FIG. 2 and FIG. 3 and (b) being the case applicable to FIG. 5, FIG. 8 and FIG. 9.

In FIG. 10, a second ½ phase plate 51 is placed before the reflex liquid crystal plate 10R' for red color range. The second ½ phase plate, as shown in FIG. 7(*a*), has a characteristic that the plane of polarization rotates once equally in all ranges, that is, from blue color range through red color range (the characteristic for p-polarized-light component→s-polarized-light component or reverse thereof), and the p-polarized-light component from the second PBS 8 is converted into the s-polarized-light component by providing the second ½ phase plate 51, thereby enabling the use of the s-polarized-light incidence type reflex liquid crystal plate 10R' for red color range and the use of the reflex liquid crystal plate common to those for other color ranges. Further, FIG. 10(*a*) shows the case applicable to the cases of FIG. 2 and FIG. 3, while FIG. 10(*b*) shows the case applicable to the cases of FIG. 5, FIG. 8 and FIG. 9.

Figure 11:
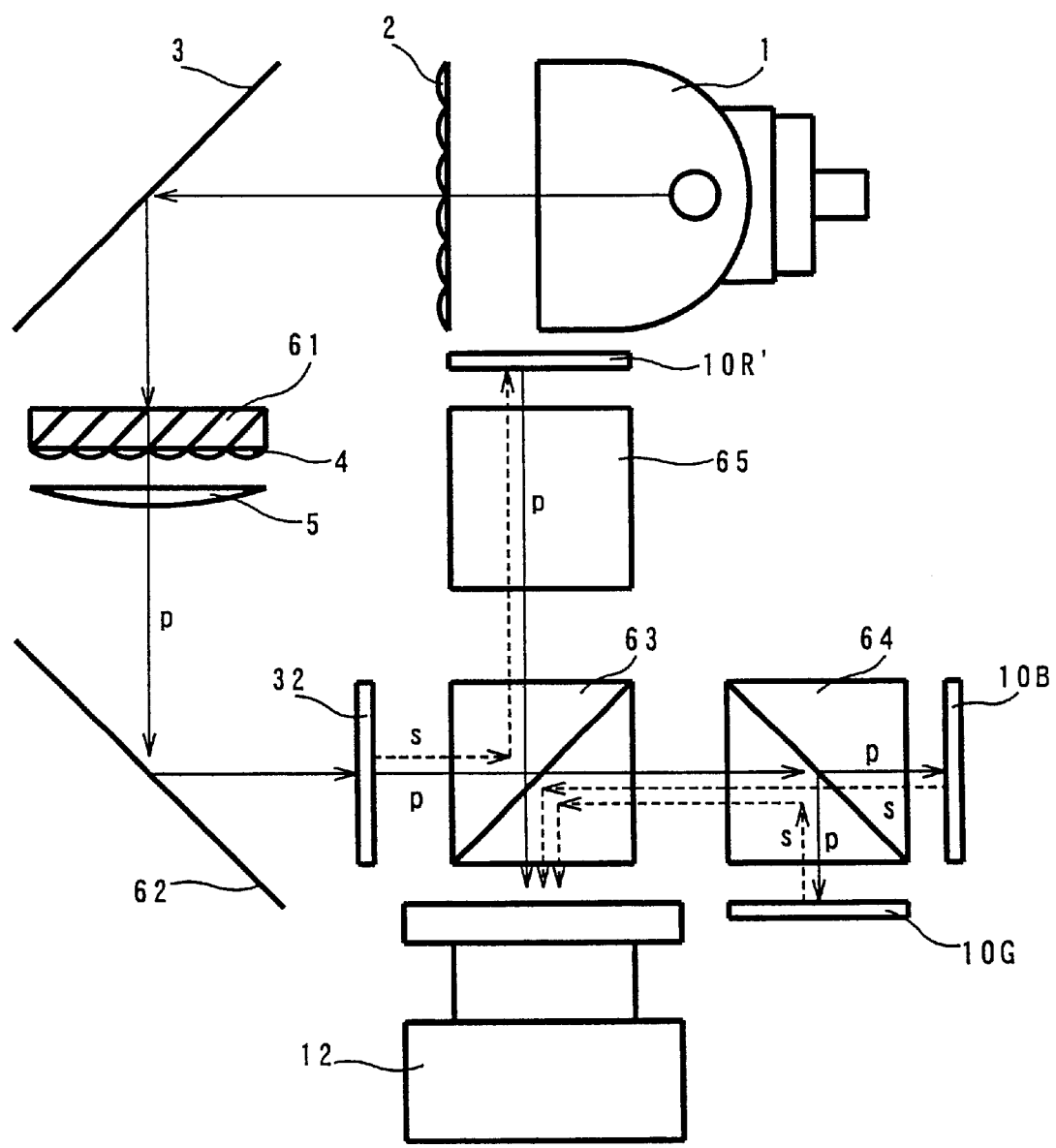
FIG. 11 is a schematic structural diagram illustrating the principal parts of the sixth embodiment of the present invention.

FIG. 11 shows the liquid crystal projector equipment as the sixth embodiment of the present invention, wherein numeral 61 denotes a fifth PBS for obtaining p-polalized-light component from the white light coming from the light source 1; 62, the total reflection mirror; 63, a sixth PBS for reflecting the s-polarized-light component while transmitting the p-polarized-light component; 64, the second dichroic prism for transmitting blue-color-range light while reflecting green-color-range light; 65, a glass prism for adjusting the position of the back focus from the projection lens 12 to other color.

In the arrangement described above, the white light from the light source 1 is adjusted to the p-polarized-light component by means of the fifth PBS 61 and strikes the first ½ phase plate 32 by way of the total reflection mirror 62, whereby the plane of polarization of the red-color-range light is rotated 90° to be converted into the s-polarized-light component, while the planes of polarization of other color ranges are not rotated to permit direct transmission of the p-polarized-light components.

The light from the first ½ phase plate 32 strikes the sixth PBS 63, of which the s-polarized-light component (red-color-range light) is reflected to strike the reflex liquid crystal plate 10R' for red color range by way of the glass prism 65, while the p-polarized-light component (blue-color-range light and red-color-range light) is transmitted to strike the second dichroic prism 64. The blue-color-range light transmits the second dichroic prism 64 to strike the reflex liquid crystal plate 10B for blue color range, while the green-color-range light is reflected by the second dichroic prism 64 to fall on the reflex liquid crystal plate 10R for green color. The image lights modulated and reflected by the reflex liquid crystal plates 10R', 10B and 10G respectively are synthesized by the second dichroic prism 64 and the sixth PBS 63 and projected on a screen by means of the projection lens 12.

With this arrangement, one PBS can be omitted. Further, in the sixth embodiment, only the reflex liquid crystal plate 10R' for red color range is used as a s-polarized-light input type; therefore, the second ½ phase plate may be provided before the reflex liquid crystal plate 10R' so that the p-polarized-light input type similar to those for other color ranges can be used.

Further, for each of the embodiments described in the foregoing, description is made as to only one arrangement. Needless to say, however, each embodiment can be carried out with each of the reflex liquid crystal plates for red color range, green color range and blue color range. In order to do so, however, it is necessary to selectively use the dichroic mirror, dichroic prism, filter, narrow-band PBS or narrow-band ½ phase plate having proper characteristics depending on the position of the reflex liquid crystal plate for each color.

Industrial Applicability

As described in the foregoing, the object of the present invention is to reduce the number of dichroic mirrors by providing color separating ability through the use of the filter or PBS having narrow-band characteristic, or to reduce the number of PBS's by using the ½ phase plate having the narrow-band characteristic, thereby reducing the size of the equipment through reduction of the number of parts that results in the availability of low-cost liquid crystal projection equipment.

What is claimed is:

1. A liquid crystal projection equipment comprising a light source for emitting a white light, a first dichroic mirror for reflecting a green-color-range light from the light source while transmitting a red-color-range light and blue-color-range light from said light source, a first polarizing beam splitter for reflecting an s-polarized-light component of the green-color-range light, a reflex liquid crystal plate for green color range designed for receiving, modulating, reflecting and outputting, through a first polarized beam splitter, the green-color-range light incoming from the first polarizing beam splitter, a second polarizing beam splitter for reflecting s-polarized-light components of the red-color-range light and blue-color-range light from said first dichroic mirror while transmitting p-polarized-light components thereof, a reflex liquid crystal plate for blue color range designed for receiving, modulating, reflecting and outputting, through the second polarizing beam splitter, the s-polarized-light component incoming from the second polarizing beam splitter by way of a blue-color-range light transmitting filter, a reflex liquid crystal plate for red color range designed for receiving, modulating, reflecting and outputting, through a red-color-range light transmitting filter, the p-polarized-light component incoming from the second polarizing beam splitter, a first dichroic prism for transmitting image light of green color range from said first polarizing beam splitter while reflecting image light of blue color range and image light of red color range from the second polarizing beam splitter, and a projection lens for projecting image light from the first dichroic prism on a screen.

2. A liquid crystal projector equipment comprising a light source for emitting a white light, a first polarizing beam splitter for separating an s-polarized-light component from green-color-range light from the light source, a reflex liquid crystal plate for green color range designed for receiving, modulating, reflecting and outputting, through the first polarizing beam splitter, the light incoming from the first polarizing beam splitter, a second polarizing beam splitter for reflecting the s-polarized-light component of the light that has passed through the first polarizing beam splitter while transmitting a p-polarized-light component thereof, a reflex liquid crystal plate for blue color range designed for receiving, modulating, reflecting and outputting, through the second polarizing beam splitter, the s-polarized-light component from the second polarizing beam splitter incoming by way of a blue-color-range light transmitting filter, a reflex liquid crystal plate for red color range designed for receiving, modulating, reflecting and outputting, by being reflected by the second polarizing beam splitter, the p-polarized-light component from the second polarizing beam splitter incoming by way of a red-color-range light transmitting filter, a first dichroic prism for transmitting the image light of green color range from said first polarizing beam splitter while reflecting the image light of blue color range and the image light of red color range from the second polarizing beam splitter, and a projection lens for projecting the image light incoming from the first dichroic prism on a screen.

3. A liquid crystal projector equipment according to claim 2, wherein a third polarizing beam splitter and a first ½ phase plate designed for transmitting the s-polarized-light component of blue-color-range light coming from a fourth polarizing beam splitter and rotating 90° the plane of polarization of the s-polarized-light component of red-color-range light for conversion into the p-polarized-light component are provided preceding the second polarized splitter, and the s-polarized-light component (blue-color-range light) reflected by the second polarizing beam splitter falls directly on a reflex liquid crystal plate for blue color range, while the p-polarized-light component (red-color-range light) that has passed through the second polarizing beam splitter falls directly on said reflex liquid crystal plate for red color range.

4. A liquid crystal projector equipment comprising a light source for emitting a white light, a first polarizing beam splitter for separating the light coming from the light source to an s-polarized-light component for output, a first dichroic mirror for reflecting green-color-range light from the first polarizing beam splitter while transmitting red-color-range light and blue-color-range light therefrom, a second polarizing beam splitter for reflecting an s-polarized-light component of the green-color-range light coming from the first dichroic mirror, a reflex liquid crystal plate for green color range designed for receiving, modulating, reflecting and outputting, through the second polarizing beam splitter, the light coming from the second polarizing beam splitter, a first ½ phase plate for transmitting an s-polarized-light component of the blue-color-range light from said first dichroic mirror and rotating 90° the plane of polarization of an s-polarized-light component of the red-color-range light for conversion into a p-polarized-light component, a third polarizing beam splitter for reflecting the s-polarized-light component (blue-color-range light) coming from the first ½ phase plate while transmitting a p-polarized-light component thereof (red-color-range light), a reflex liquid crystal plate for blue color range designed for receiving, modulating, reflecting and outputting, through the third polarizing beam splitter, the s-polarized-light component coming from the third polarizing beam splitter, a reflex liquid crystal plate for red color range designed for receiving, modulating, reflecting and outputting, by reflecting by the third polarizing beam splitter, the p-polarized-light component coming from the third polarizing beam splitter, a first dichroic prism for transmitting the image light of green color range coming from said second polarizing beam splitter while reflecting the image light of blue color range and the image light of red color range coming from the third polarizing beam splitter, and a projection lens for projecting the image light from the first dichroic prism on a screen.

5. A liquid crystal projector equipment comprising a light source for emitting a white light, a first polarizing beam splitter for separating the light from the light source to an s-polarized-light component for output, a first dichroic mirror for transmitting the green-color-range light from the first polarizing beam splitter while reflecting the red-color-range light and blue-color-range light therefrom, a second polarizing beam splitter for reflecting an s-polarized-light component of the green-color-range light from the first dichroic mirror, a reflex liquid crystal plate for green color range designed for receiving, modulating, reflecting and outputting, through the second polarizing beam splitter, the light from the first polarizing beam splitter, a first ½ phase plate for transmitting an s-polarized-light component of the blue-color-range light from said first dichroic mirror and rotating 90° the plane of polarization of an s-polarized-light component of the red-color-range light for conversion into a p-polarized-light component, a third polarizing beam splitter for reflecting the s-polarized-light component (blue-color-range light) from the first ½ phase plate while transmitting a p-polarized-light component (red-color-range light) thereof, a reflex liquid crystal plate for blue color range designed for receiving, modulating, reflecting and outputting, through the third polarizing beam splitter, the s-polarized-light component from the third polarizing beam splitter, a reflex liquid crystal plate for red color range designed for receiving, modulating, reflecting and outputting, by reflecting by the third polarizing beam splitter, the p-polarized-light component from said third polarizing beam splitter, a first dichroic prism for transmitting the image light of green color range from said second polarizing beam splitter while reflecting the blue-color-range light and red-color-range light from the third polarizing beam splitter, and a projection lens for projecting the image light from the first dichroic prism on a screen.

6. A liquid crystal projector equipment according to claim 1, wherein a ½ wavelength plate for rotating 90° the plane of polarization of the light of total wavelength range is provided in a stage preceding a reflex liquid crystal plate for red color range, whereby the p-polarized-light component from the second polarizing beam splitter is converted into s-polarized light, and the s-polarized-light component is received, modulated, reflected and output by being reflected when falling on the reflex liquid crystal plate for red color range.

7. A liquid crystal projector equipment comprising a light source for emitting a white light, a first polarizing beam splitter for separating the light from the light source to a p-polarized-light component for output, a first ½ phase plate for rotating 90° the plane of polarization of a p-polarized-light component of the red-color-range light from the first polarizing beam splitter for conversion into an s-polarizedlight component while transmitting p-polarized-light components of blue-color-range light and green-color-range light, a second polarizing beam splitter for reflecting the s-polarized-light component (red-color-range light) from the first ½ phase while transmitting the p-polarized-light component (blue-color-range light and green-color-range light), a reflex liquid crystal plate for red color range designed for receiving, modulating, reflecting and outputting, through the second polarizing beam splitter, the s-polarized-light component coming from the second polarizing beam splitter, a dichroic prism for transmitting the blue-color-range light having the p-polarized-light component from said second polarizing beam splitter while reflecting the green-color-range light thereof, a liquid crystal plate for blue color range designed for receiving, modulating, reflecting and outputting, through the dichroic prism and by reflecting by said second polarizing beam splitter, the blue-color-range light coming from the dichroic prism, a reflex liquid crystal plate for green color range designed for receiving, modulating, reflecting and outputting, by reflecting by the dichroic prism and said second polarizing beam splitter, the green-color-range light coming from the dichroic prism, and a projection lens for projecting the image light from the second polarizing beam splitter on a screen.

8. A liquid crystal projector equipment according to claim 7, wherein a ½ wavelength plate for rotating 90° the plane of polarization of the light of total wavelength range is provided preceding the reflex liquid crystal plate for red color range, whereby the s-polarized-light component from the dichroic prism is converted into the p-polarized-light component, and the p-polarized-light component is received, modulated, reflected and outputted by being reflected when falling on the reflex liquid crystal plate for red color range.

* * * * *